E. R. CURTIS.
CENTRIFUGAL MACHINE.
APPLICATION FILED JUNE 4, 1917.
1,248,821.
Patented Dec. 4, 1917.
2 SHEETS—SHEET 1.
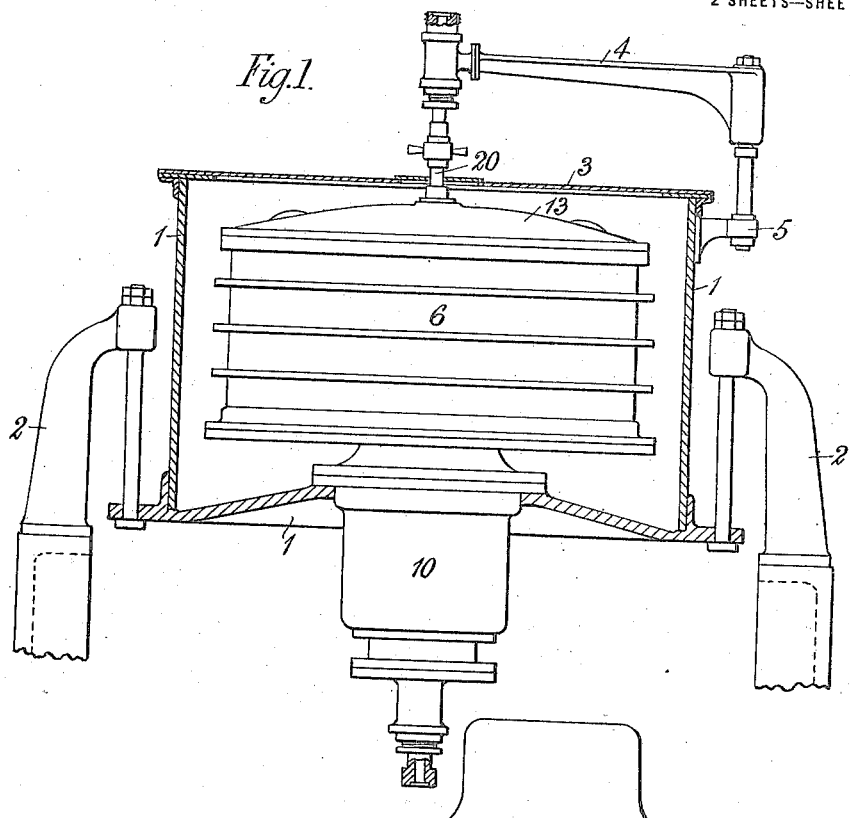
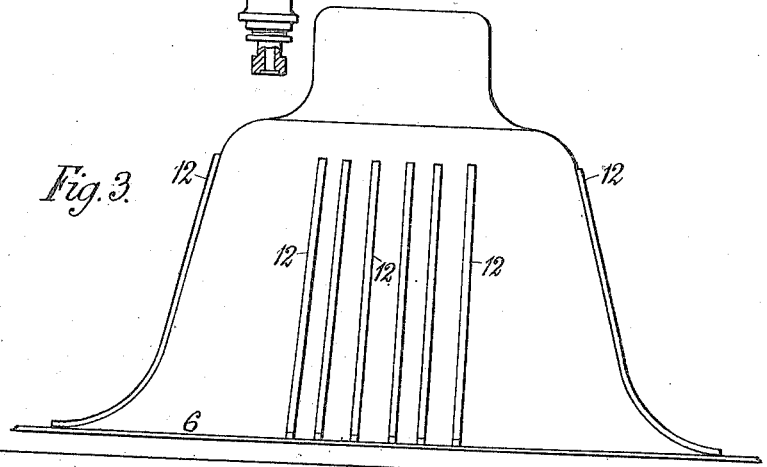
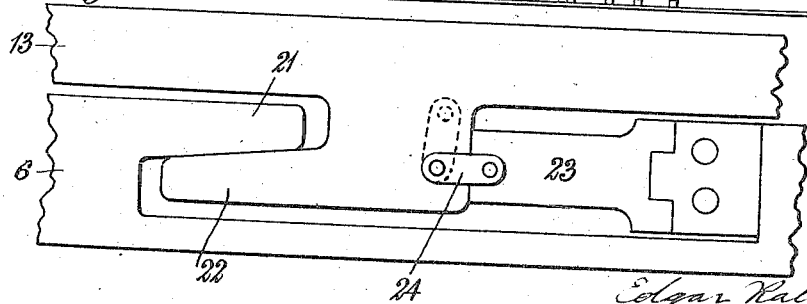

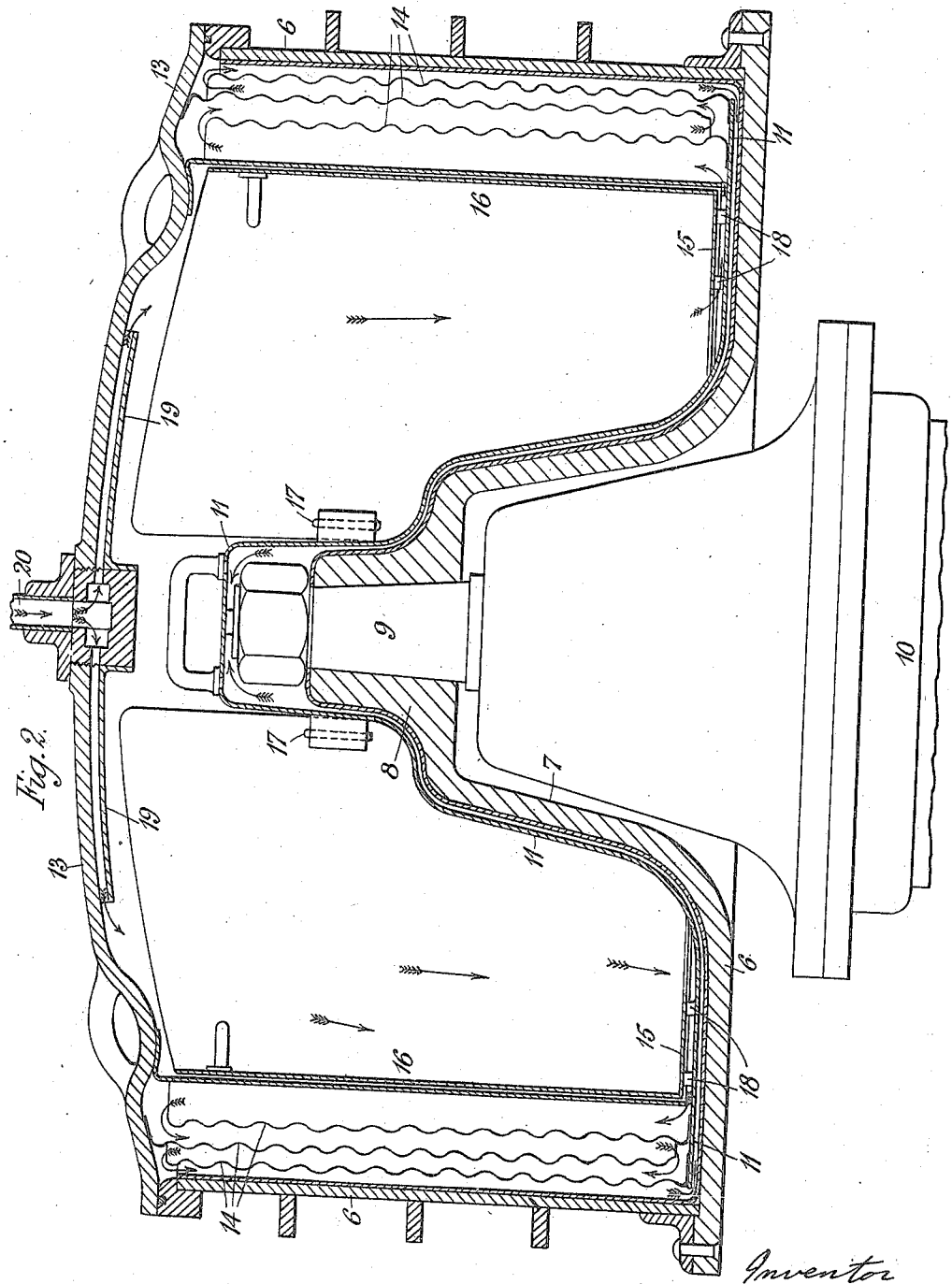

UNITED STATES PATENT OFFICE.

EDGAR RALPH CURTIS, OF BRIGHTON, ENGLAND.

CENTRIFUGAL MACHINE.

1,248,821.  Specification of Letters Patent.  Patented Dec. 4, 1917.

Application filed June 4, 1917. Serial No. 172,682.

*To all whom it may concern:*

Be it known that I, EDGAR RALPH CURTIS, a subject of the King of Great Britain, residing at 21 Davigdor road, Brighton, England, have invented a new and useful Improvement in Centrifugal Machines, of which the following is a specification.

This invention relates to the art of separating solids from gaseous liquids, such as beer, by centrifugal apparatus, and the object of the invention is to provide an improved and highly efficient machine which will separate solids which are with difficulty separated from gaseous liquors, the machine being also useful in clearing chemical substances.

According to this invention, the liquid before it reaches its axial outlet passes alternately to and fro over surfaces arranged parallel to the axis of the machine and which are preferably corrugated.

The machine may comprise a vessel provided at one end with a central indentation and with a boss for the passage of a hollow driving shaft.

The indentation and the end of the hollow shaft are surrounded by a hood, the passage of liquid between the vessel and the hollow shaft taking place between ribs formed on the outer surface of the indentation.

The invention is illustrated in the accompanying drawings, Figure 1 showing the basket of a centrifugal machine and its driving mechanism in elevation, its pan being in section. Fig. 2 shows the basket in section, its driving means being in elevation.

Fig. 3 is a part elevation of the lining of the basket and Fig. 4 is a side elevation of a portion of the basket and its cover.

1, Fig. 1, is a steel pan suspended on pedestals 2; 3 is the cover of the pan provided with an inlet pipe and carried by a swinging arm 4 supported by a bracket 5 on the pan.

6 is a copper lined steel basket provided, see Fig. 2, with a central indentation 7 and with a boss 8, keyed to a hollow shaft 9 driven by an electric motor 10.

11 is a hood fitting over the indentation 7 and the bottom of the basket, passage ways for liquid being formed between the hood and the basket by ribs 12, (Fig. 3), secured to the basket lining.

13 is the basket cover and 14 are corrugated metal rings alternately fast with the cover 13 and the hood 11.

15 are removable trays for receiving the deposit of solid matter each provided with a radial side 16; 17 are hooks fixed to the radial tray sides which engage in recesses formed in projections on the hood 11. 18 are feet attached to the underside of the trays 15.

19 is a distributing plate fixed to the cover 13 and provided with radial ribs to form a passage for liquid passing into the basket through a pipe 20.

The cover 13 is applied closely against the basket by a number of bayonet joints of which two or more are provided with means for preventing a turning movement of the cover 13 in one direction. The mouth of the basket is for this purpose recessed at intervals and provided with inclined tongues such as 21, Fig. 4, while the cover is provided with depending inclined tongues such as 22 which when the cover is turned in one direction apply the cover tightly against the mouth of the basket.

23 is a hinged stop maintained in position by a pivoted catch 24.

In the use of the apparatus described, liquid, such as beer, passes in at the pipe 20 and thence through the spaces between the ribs of the plate 19.

The apparatus is kept quite full of beer and is rapidly rotated, the heavier solids flying outward and clinging to the outer wall and gradually falling to the bottom in the usual manner and on to the removal tray 15; the partially cleared beer according to this invention then flows to and fro over the metal rings 14, the solids being thrown against the outer wall of each ring in turn and gradually falling to the bottom. The passage of the liquid through the machine is indicated by the arrows, outlet being through the hollow shaft 9. The rings 14 are preferably corrugated because better results are to be obtained than where plain rings are used.

Although in the machine described liquid enters through the cover and passes out through the hollow shaft, it might equally well pass in through the hollow shaft and out through the cover, in which case the corrugated rings would be located nearer the axis of the machine than the inlet thereto.

What I claim is:—

1. A centrifugal machine comprising a vessel having an axial inlet and an axial outlet, a plurality of surfaces arranged parallel to the axis of the machine and means for causing the liquid to be treated to flow alternately to and fro over said surfaces.

2. A centrifugal machine comprising a vessel having an axial inlet and an axial outlet, a plurality of corrugated surfaces arranged parallel to the axis of the machine and means for causing the liquid to be treated to flow alternately to and fro over said surfaces.

3. A centrifugal machine comprising a vessel having an axial inlet and an axial outlet, a cover to the vessel and a plurality of parallel rings, fixed alternately to the cover and at the bottom of the vessel.

4. A centrifugal machine comprising a vessel having an axial inlet and an axial outlet, a cover to the vessel and a plurality of parallel corrugated rings, fixed alternately to the cover and at the bottom of the vessel.

5. A centrifugal machine comprising a hollow shaft for the passage of liquid, a vessel driven by the shaft having a central indentation, a cover to the vessel, a hood fitting over the end of the hollow shaft and the indentation, and rings arranged parallel to the axis of the machine alternately carried by the cover and the hood.

6. A centrifugal machine comprising a vessel having an axial inlet and outlet and a central indentation, a hood fitting over said indentation, ribs forming passage ways for liquid between the hood and the indentation, a plurality of surfaces arranged parallel to the axis of the machine and means for causing the liquid to be treated to flow alternately to and fro over said surfaces.

7. A centrifugal machine comprising a vessel having an axial inlet and an axial outlet, a cover, a plurality of interacting inclined surfaces on the cover and the vessel removable means for preventing a turning movement of the cover relatively to the vessel in one direction, a plurality of surfaces arranged parallel to the axis of the machine and means for causing the liquid to be treated to flow alternately to and fro over said surfaces.

8. A centrifugal machine comprising a vessel having an axial inlet and an axial outlet, a plurality of removable trays arranged at the bottom of the vessel, each tray having one radial side, a plurality of surfaces arranged parallel to the axis of the machine and means for causing the liquid to be treated to flow alternately to and fro over said surfaces.

9. A centrifugal machine comprising a hollow shaft for the passage of liquid, a vessel driven by the shaft and having a central indentation, a hood fitting over the end of the hollow shaft and the indentation, a plurality of removable trays arranged at the bottom of the vessel, each tray having a radial side, projections on the outside of the hood to aid in retaining the trays in position, a plurality of surfaces arranged parallel to the axis of the machine, and means for causing the liquid to be treated to flow alternately to and fro over said surfaces.

In testimony that I claim the foregoing as my invention I have signed my name this 14th day of May 1917.

EDGAR RALPH CURTIS.

Copies of this patent may be obtained for five cents each, by addressing the "Commissioner of Patents, Washington, D. C."